United States Patent Office.

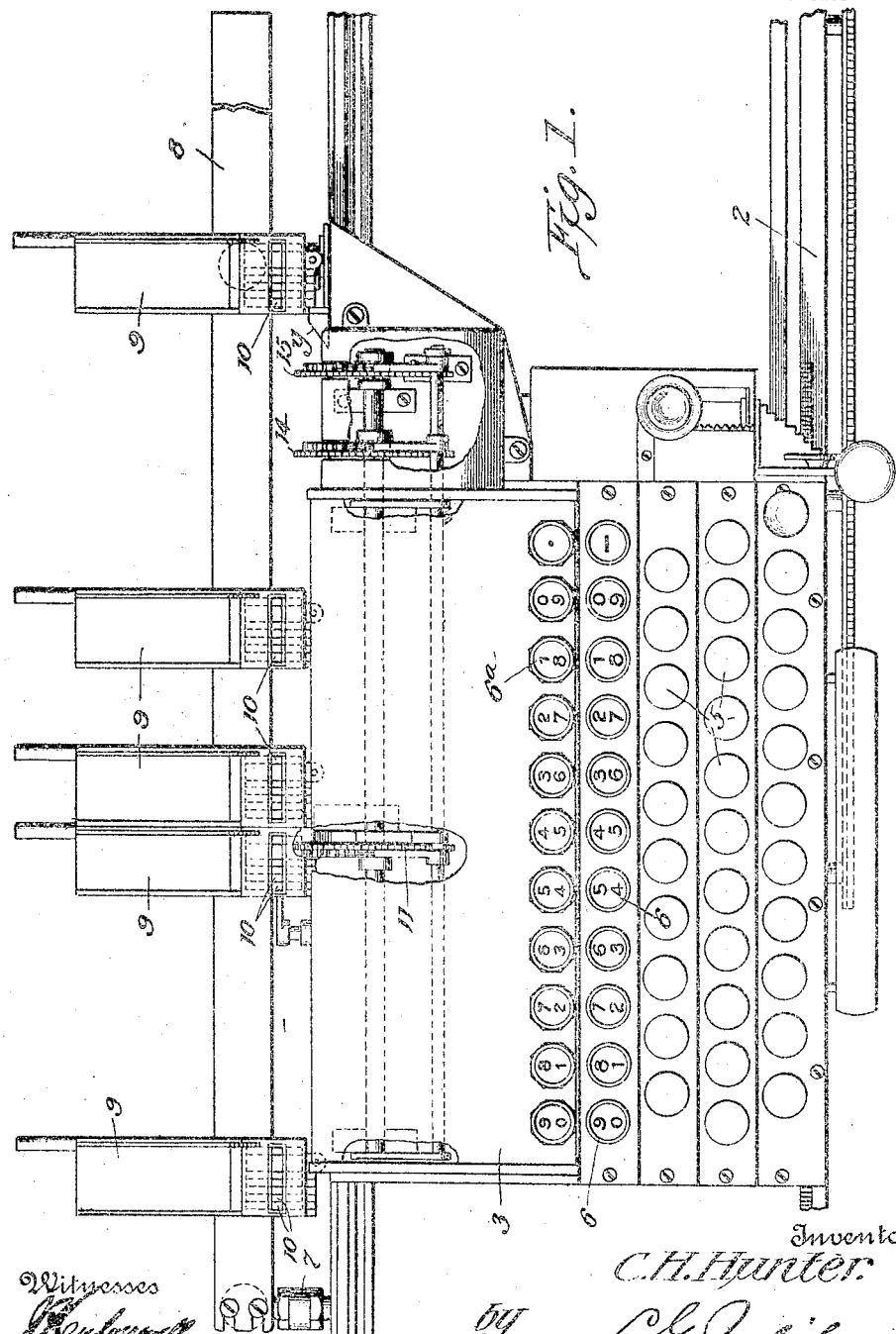

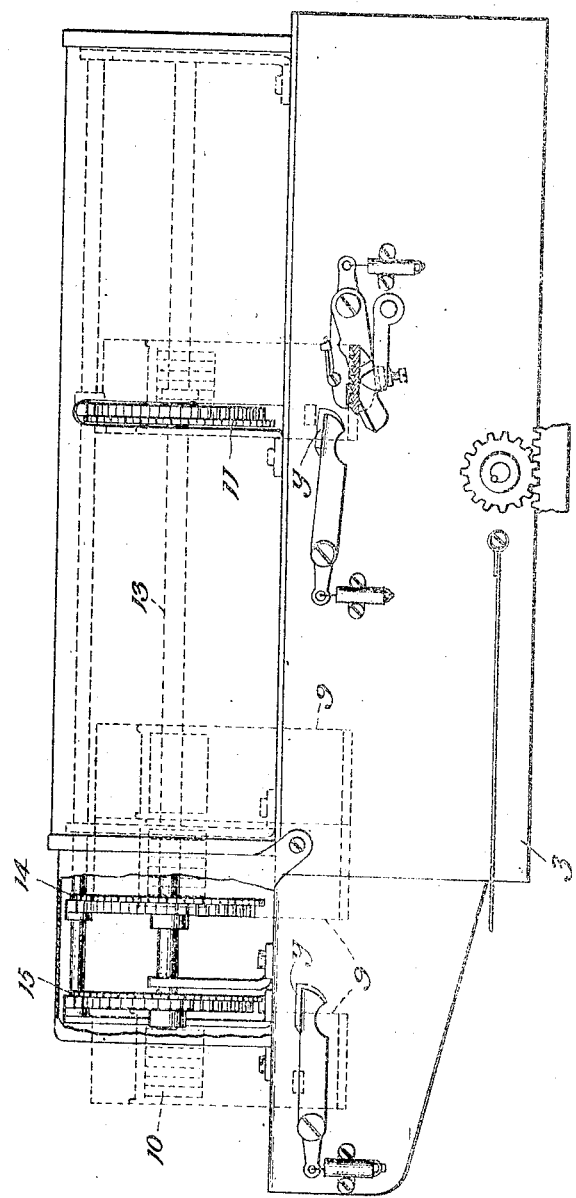

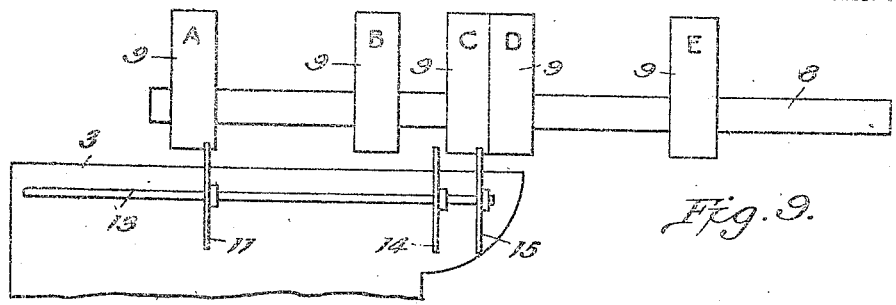
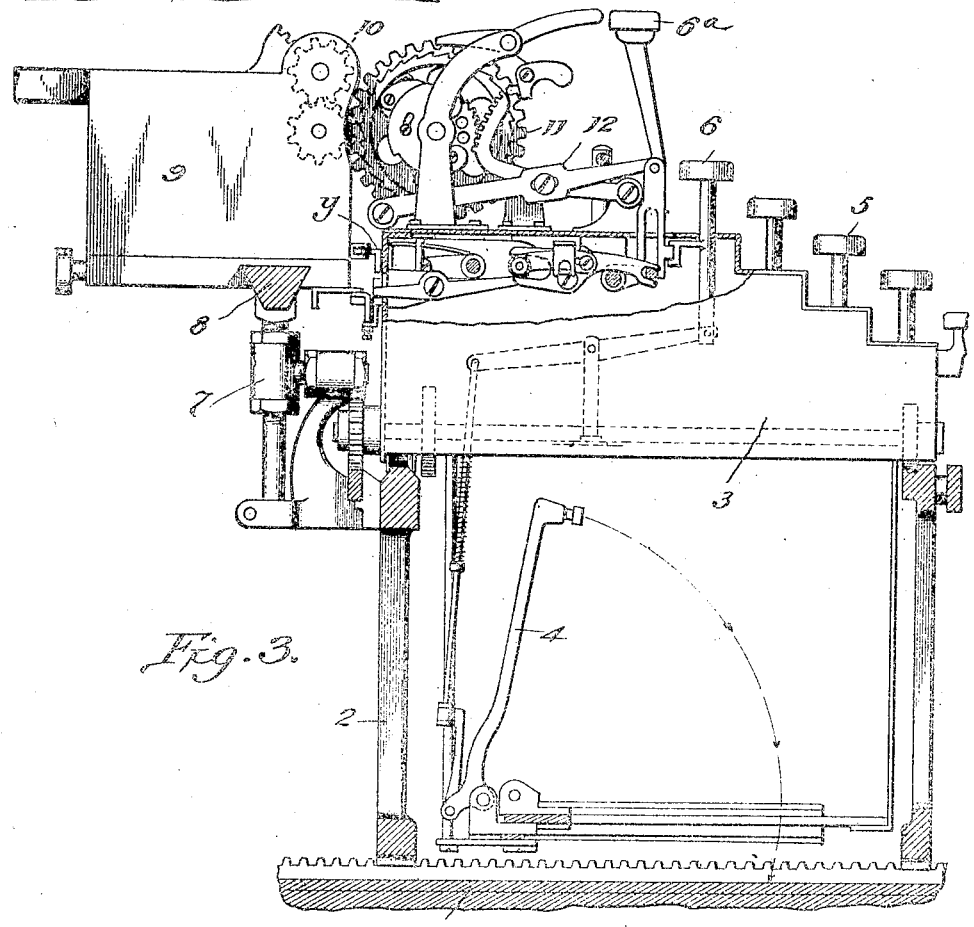

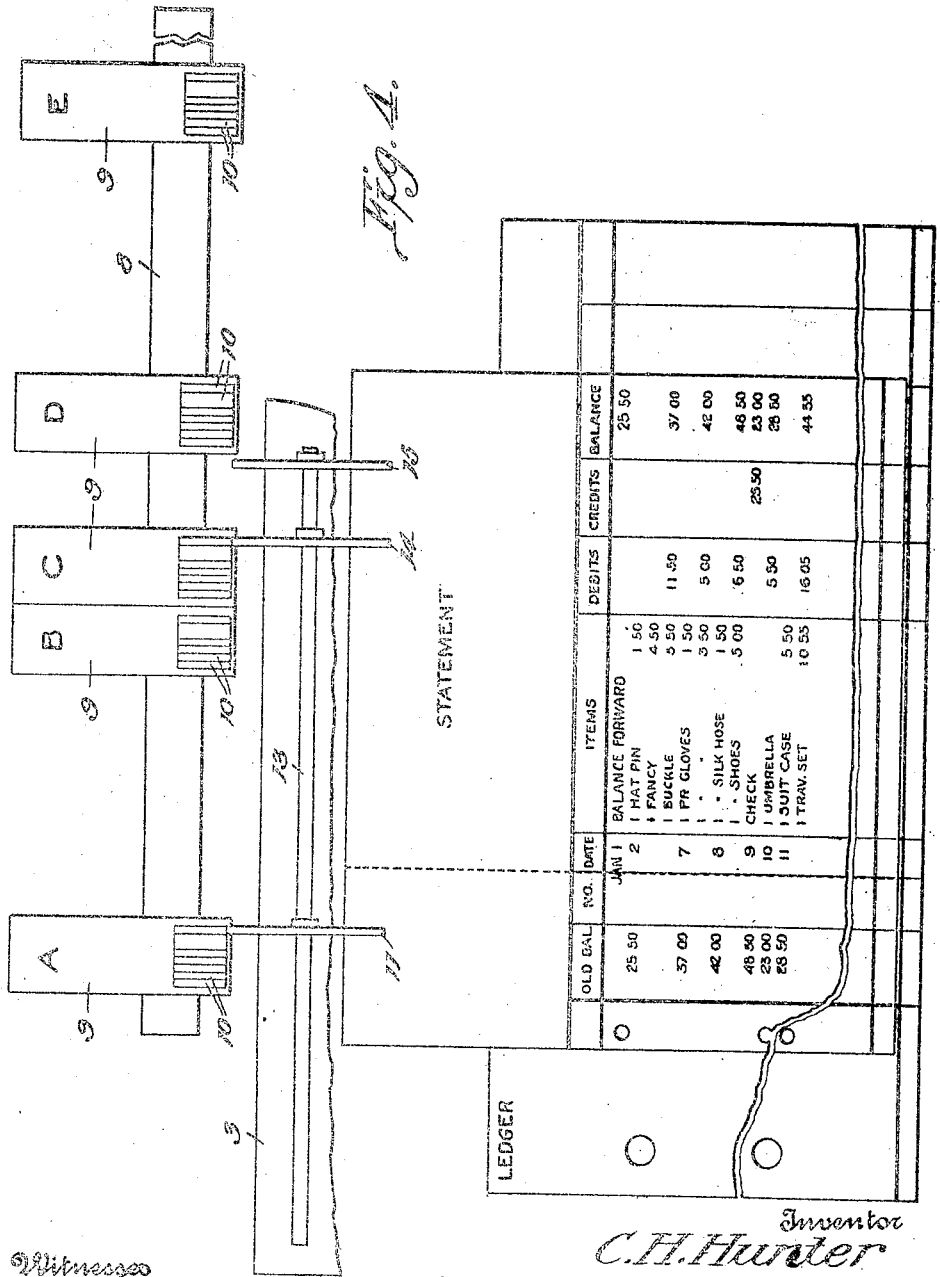

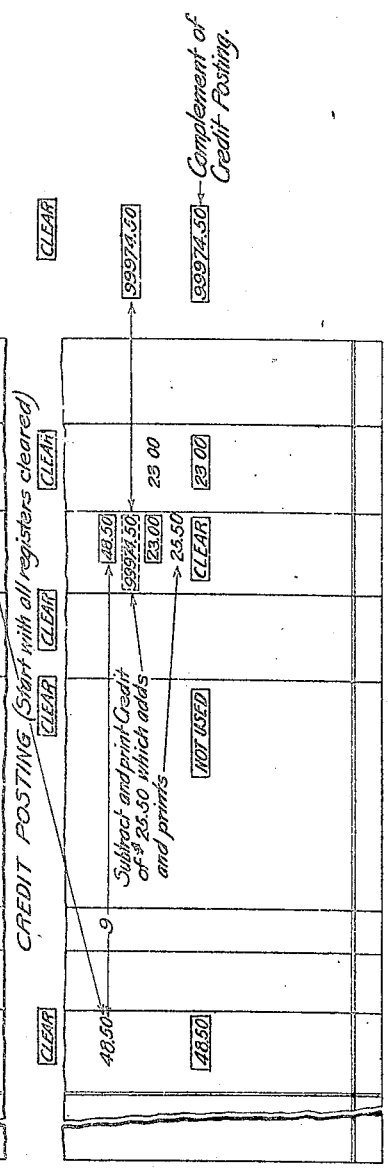

CHARLES H. HUNTER, OF HARRISBURG, PENNSYLVANIA, ASSIGNOR TO ELLIOTT-FISHER COMPANY, OF HARRISBURG, PENNSYLVANIA, A CORPORATION OF DELAWARE.

COMBINED TYPE-WRITING AND COMPUTING MACHINE.

1,323,283.

Specification of Letters Patent.

Patented Dec. 2, 1919.

Application filed November 30, 1914. Serial No. 874,904.

*To all whom it may concern:*

Be it known that I, CHARLES H. HUNTER, a citizen of the United States of America, residing at Harrisburg, in the county of Dauphin and State of Pennsylvania, have invented certain new and useful Improvements in Combined Type-Writing and Computing Machines, of which the following is a specification.

My present invention relates to billing machines of that class which is characterized by writing mechanism combined with computing devices which effect mechanical computations as the elements thereof are written and recorded.

The object of the invention is to produce a machine adapted to facilitate accounting operations by relieving the operator of the necessity for mental calculation and by mechanically proving or checking the result of each operation accomplished.

More specifically stated, a primary object of the invention is to provide means whereby the bill or statement may be made out and the ledger simultaneously posted, after each transaction or series of transactions, and the condition of the account, with extended balance or total, constantly shown and mechanically checked or proved, the ultimate end attained being the proving or checking of every operation and the securing of a complete statement of the exact condition of the account after each debit or credit posting.

To the accomplishment of the object stated, one embodiment of the invention resides in the construction and arrangement shown in the accompanying drawings and hereinafter fully described.

In said drawings:—

Figure 1 is a plan view of an Elliott-Fisher billing machine equipped in accordance with my invention.

Fig. 2 is a rear view of a portion of the carriage of the machine shown in Fig. 1, designed more particularly to show the relative locations of the master wheels of the triplex actuator and the resetting cams for the registers.

Fig. 3 is a sectional end elevation of the machine.

Fig. 4 is a diagrammatic view designed to show the arrangement of the printed record for the performances of one of the billing operations for which the machine is adapted, and also to make clear the manner in which the respective registers are appropriated to the various portions or columns of the record.

Fig. 9 is a diagrammatic view showing the registers positioned for a credit posting, and Fig. 10 is a diagrammatic view showing step by step the results of posting operations.

Figure 5:
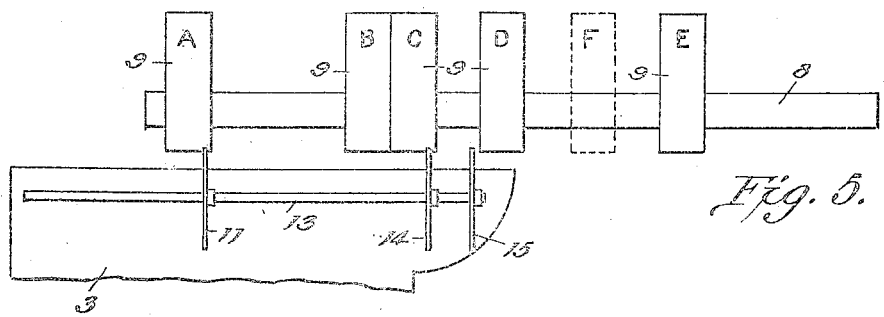
Figs. 5, 6, 7 and 8 are diagrammatic views of the different relative positions assumed by the actuator with respect to the registers during a debit posting.
Figure 6:
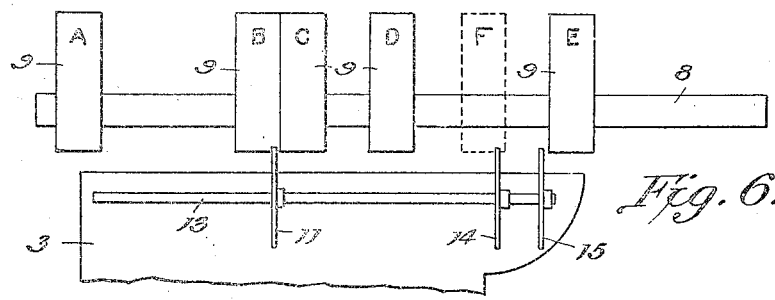

It may be stated, by way of premise, that the machine, which for purposes of illustration I have shown equipped with my invention, is what is known to commerce as the Elliott-Fisher billing machine. The general and well known characteristics of this machine will be briefly described.

The Elliott-Fisher machine includes a flat platen 1 over which a machine frame 2 travels longitudinally for line spacing. The frame 2 supports a carriage 3 movable transversely of the platen for letter spacing and this carriage in turn supports downwardly acting printing devices 4, operated by letter and numeral keys 5 and 6 through suitable intermediate connections. In addition to these features are the various adjunctive mechanisms of flat platen typewriters.

In addition to the typewriting mechanism, the machine embraces computing mechanism which is operated from numeral keys of the typewriter. Supported in rear of the carriage 3 on brackets 7, attached to the frame 2, is what is known as a register bar 8 disposed parallel with the path of travel of the carriage 3 and adapted to support one or more registers 9, each embracing a series of denominational members 10, suitable carrying mechanism (not shown) and various other structural features, the specific character of which are not material to this disclosure. These denominational members 10 are spaced to correspond with the letter space advance of the carriage and are designed to be operated by actuating mechanism including a master wheel 11, mounted on and movable with the carriage 3 to successive denominational members, and what has come to be known as differential mechanism 12 intermediate of the master wheel and the numeral key 6. This differential mechanism is so constructed that the master wheel is rotated by each of the numeral keys, a number of increments or units of movement corresponding to the value of the particular key operated. It will thus be seen that the denominational position of the master wheel with respect to the register is determined by the position of the carriage, so that the denominational member operated will correspond in denominational position to the denominational position in which a digit is printed in the column. It will be equally clear that the extent or value of the operation of the denominational member so selected will correspond with the value of the particular key depressed and the particular digit printed.

As is clearly shown in the patents to which attention has been directed, it is quite common to provide the register bar 8 of the billing machine with any number of registers 9 appropriated to different columns so that when the typewriter is in position to print in any one of several columns, the master wheel 11 will be in position to operate in one of several registers, so that one or more columns may be mechanically added as the record is made by the machine. In accordance with my invention, however, the actuator is so amplified by the addition of supplemental master wheels and the registers are so relatively disposed, that in those types of billing operations with which the invention is concerned, certain registers occupying different column positions will be simultaneously operated during the printing of a number in a column under certain conditions or operated independently under other conditions, still other registers being operated to effect entirely independent computations. In other words, the registers and the actuating mechanism are so related that, while certain registers are entirely independent in their operation, an interrelation will exist between the computations of other registers so that a proof or check may be secured by the mechanical inclusion in one register of the sum of the results secured in other registers, the registers last named being thus made to show totals of different import which, when combined, must equal the total shown by another register if the operation has been performed correctly.

To be more explicit, I extend the main shaft 13 of the actuator beyond the right hand end of the carriage 3 and attach thereto two additional master wheels 14 and 15 spaced apart just sufficiently to prevent both of said master wheels from engaging a register at the same time. Thus when the primary master wheel 11 is rotated in the usual manner by the rotation of the shaft 13, to which the differential devices are connected, the auxiliary master wheels 14 and 15 will be given an exactly similar movement, provision against over-running or under-running of the auxiliary wheels being made by providing the same with duplications of the safety devices ordinarily employed in connection with the primary master wheel. In addition to this triplex or three wheeled actuator, I so dispose a series of five registers A, B, C, D, and E on the bar 8 that the first and third registers, to-wit, A and C, may be operated in correspondence when a number is printed in a column to which the first register A is appropriated. The relation of the registers also permits the second register B and the fourth register D to be operated independently of each other and of the other registers but compels the simultaneous operation of the third register C and the fifth register E whenever a number is printed in a column to which the register C is appropriated.

Thus in the diagrammatic Fig. 4 of the drawings is shown a ledger sheet and a superposed statement designed to receive simultaneously the record produced by the posting operation. At the left hand side of the statement is a column marked "Old balance," to which the register A is appropriated. To the right of this column is the usual space for the number and date; then a space for the entry of items. Next is an item or detail column, to which the register B is appropriated. Next is the debit column, to which the register C is appropriated. Next is the credit column to which no register is appropriated because, in this diagrammatic showing, the machine is "set" for debit posting. To the right of the credit column is the new balance column to which the register D is appropriated. The register E is merely a proof or check register and corresponds to no column on the statement.

Let us assume that the current or old balance of the customer, whose account is to be posted, is $25.50, as shown in Fig. 10, and that a debit posting is to be made. The operator first prints the old balance in the old balance column and as he does so, it will be seen, by reference to Fig. 5, that the amount $25.50 is set up in each of the registers A and C, to wit, the old balance register and the debit register. Next the operator proceeds, if a detail posting is in order, to print the debit items in the item column, the items shown in Fig. 10, being,

| | |
|---|---|
| 1 Hat pin | $1.50 |
| 1 Fancy | 4.50 |
| 1 Buckle | 5.50 |

Figure 7:
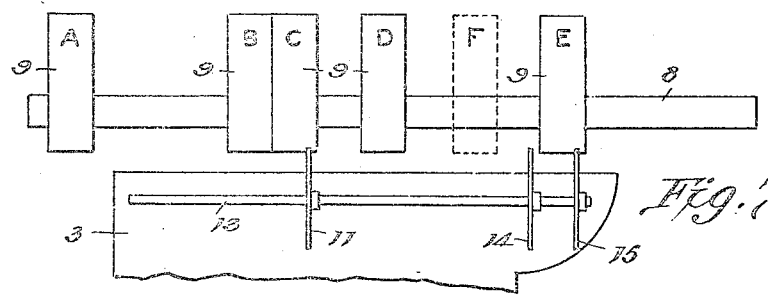
Figure 8:
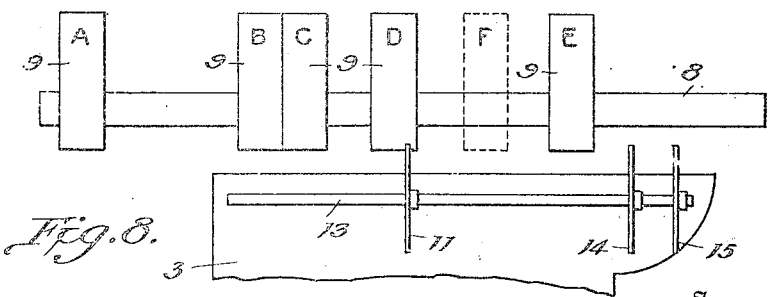

These amounts will now have been accumulated in the item register B by the operation of the primary master wheel 11 and its the auxiliary master wheels are not opposite registers, this operation of the register B will be entirely independent. The total of the debit items thus accumulated, to wit, $11.50, will now be displayed in the register B and will be copied therefrom into the debit column, see Figs. 7 and 10. This act will accomplish two results aside from the printing of the total debits in the debit column. First, it will add $11.50, the amount of the total debits posted, to the old balance ($25.50) already in debit register C, thus causing said register C to display a new total or balance of $37.00. Second, the act of printing the debit total in the debit column will accumulate the amount of such debit total, to wit, $11.50, in the proof or check register E because, as shown in Fig. 7, the auxiliary master wheel 15 will be in coöperation with the register E during this operation of printing the total debit in the debit column. Now then, register A will show the old balance of $25.50. Register B will show the total debits of this particular posting, $11.50. Register C will show the sum of the old balance and the total debits of the current posting, to wit, $37.00, and the check or proof register E will show the amount of the total debits, to wit, $11.50. The check register E will now be seen to afford a check or proof of the accuracy of the total debit extension because, the act of printing the total debits is the act which set up the register E, and if the operation was accurate, the register E must of necessity correspond with the total accumulated in the item register B during the printing of the debit items. But that is not all because a further check is provided by the fact that the debit accumulation in the register E, plus the old balance shown in register A, must equal the new balance shown in register C. This last named relation will be seen to properly check the operation when skeleton posting instead of detail posting is desired, because if we eliminate detail register B and the detail debit column, the safeguard afforded by the corresponding registers B and E is not obtained but an absolute check is, nevertheless, afforded by the fact that the amount accumulated in the debit register C must correspond with the sum of the amounts accumulated in registers A and E. Having now ascertained the amount, to wit, $37.00, accumulated in the debit register C, the operator copies this amount in the balance column and accumulates it independently in register D. (See Fig. 8). This amount, $37.00, now becomes the current or old balance with which the next posting operation is to start and the operator, after clearing the item debit register B and the total debit register C, proceeds with his next debit posting in the manner just described. The registers A, D and E are not cleared because, as the balance increases with each posting, so also must the old balance and the total debits be added in the registers A and E respectively, so as to perpetuate the proof afforded by the requirement that the sum of the amounts registered by the old balance register A and the proof register E must always equal the amount accumulated in the balance register D.

It has already been stated that the detail or item register B may be omitted, though it is desirable to employ this register in order to secure accuracy in the addition of the debit items. There are other variations also which will readily suggest themselves. For instance, in retail department store work, where customers frequently buy in several departments and thus cause several separate sales tickets to be made out on one day's purchases, it has been found highly efficient to use six registers, an extra register F being located between registers D and E and indicated in dotted lines in Fig. 5, so that items listed in the items column and accumulated in register B will also accumulate in the extra register F. Register B proves the sales clerk's addition of each charge ticket and is cleared after each charge ticket is entered, while the extra register F is not cleared after the entry of each ticket but is caused to accumulate all items purchased that day on the several charge tickets of the customer. Thus, if three charge tickets are being entered to one customer, the register B proves the additions of the three sales clerks separately as the three tickets are entered and the extra register F shows the total of all three tickets belonging to that customer and gives the amount or total debit which is to be written in the charge or credit column and accumulated in the registers C and E, as heretofore explained. The register F is then cleared. In the variation just described, the extra register F will be seen to constitute a total item register for securing the total debit to be charged covering each particular complete posting, while the register B constitutes what is in effect a sub-total item register for computing the sub-totals or charge slip totals of each of several groups of items to be included in the posting. The other registers A, C, D and E retain the original character, the register C being cleared after each posting operation and the registers A and E checking against the register D.

In credit posting, the general character of operation is the same as in debit posting with the same mechanical checks against error but the operation of subtraction to deduct the credit from the balance is accomplished by what is known as complemental addition, an operation too well known to require specific explanation. The method of operation in making a credit posting will, however, be briefly stated. Preliminary to the credit posting all registers are cleared, the debit item register B is eliminated and the register C, which will now be utilized to accumulate credits negatively as subtractions from the old balance, will be shifted along the register bar to a position corresponding to the position of the credits column on the statement. (See Fig. 9). The tabulating mechanism of the typewriter will, of course, be correspondingly reset.

The first operation is to write the old balance, for instance, $48.50, in the old balance column which will cause this number to be set up in registers A and C by the master wheels 11 and 15. Next we subtract by complemental addition by printing the credit posting of $25.50 in the credit column which adds the complement of $25.50, to wit, 99974.50 in credit register C and also in check or proof register E. It must be remembered, however, that the register C has already accumulated the old balance, to wit, $48.50, and by reason of the addition thereto of the complement, will now read $23.00, which is the new balance. This new balance is now written in the balance column and accumulated in balance register D, just as in posting the debits. The register C is now cleared before the machine is returned for a new line and the described operation is repeated in the posting of succeeding credits.

Register E, while posting credits, always shows the complement of the total credits. For instance, if total credits of $561.82 have been posted, register E will read 99438.18. Likewise, when posting a credit to an account having a debit balance less than the amount of the credit posting, the computing register C will show the complement of the credit balance. For instance, if a credit of $25.65 is posted to an account having a debit balance of $9.24, credit register C will read 99983.59. In credit posting, the same character of proof is secured as in debit posting because the new balance shown by credit register C, plus the complement of the minus quantity shown in register E, must equal the old balance and if desired, the minus quantity shown in the check or proof register E, may be proved by adding thereto the amount of the credit entry which should result in clearing the register E. This last named operation of clearing the register E is ordinarily accomplished by the manipulation of the non-print keys 6ª with which the billing machine is ordinarily provided, as shown in Patents #573,868 to R. J. Fisher; #829,971 to Laganke and Smith; #825,494 to John A. Smith; #863,232 to John A. Smith; #992,342 to W. L. Dench; #1,012,463 to John A. Smith and #1,037,350 to John A. Smith.

For the purpose of the present disclosure, I have considered it necessary to describe in detail only the mode of operation of the machine in the posting of debits and credits and the extension of the balance after each entry. It will be understood, however, that the machine is susceptible to many other modes of operation in connection with other forms of accounting and in posting to accounts of varying conditions. In all cases, however, the underlying principle of operation is the same and in all cases proof is secured. For instance, in posting a charge to an account already showing a debit balance, the proof is that the old balance plus the debit posting, must equal the new balance.

In posting a charge to an account showing an old credit balance which is greater than the charge posted, resulting in a new credit balance, the proof is that the old balance shown complementally plus the charge posted, must equal the new balance also registered complementally.

In posting a charge to an account having an old credit balance less than the amount of the charge which results in a new debit balance, the proof is that the old balance expressed complementally, plus the debit posting must equal the new balance.

In posting a credit to an account having an old debit balance greater than the credit posting which results in a new debit balance, the proof is that the old balance, plus the complement of credit, must equal the new balance.

In posting a credit after an account with a debit balance less than the credit posting which results in a new credit balance, the proof is that the old balance plus the complement of the credit posting, equals the complement of the new credit balance.

In posting a credit to an account with an old credit balance which, of course, results in a new credit balance, the proof is that the old balance expressed complementally, plus the credit posting, also expressed complementally, must equal the new balance, the complement also of which is registered.

It may be stated in passing that all debits, whether old balance, posting or new balance, appear in black, are written and added, and all credits, whether old credit balance, posting or new credit balance, are written in red and are always subtracted and printed.

It may also be stated in passing that where auxiliary master wheels are employed, as herein shown, it is desirable to employ a plurality of restoring cams Y, (see Fig. 2) for the carrying or transfer devices of the registers. This duplication of the single restoring cam ordinarily employed is not absolutely necessary but it avoids the necessity for moving the carriage a sufficient distance to the right to place the single cam in position to restore all registers as the carriage is retracted.

It is believed that from the foregoing, the constructions, mode of operation and advantages of my invention will be clearly apparent but while the illustrated embodiment of said invention is considered preferable at this time, I wish to be understood as reserving to myself the right to effect such changes, modifications and variations of the illustrated arrangement as may come fairly within the scope of the protection prayed.

Having described my invention, what I claim is:—

1. In a recording and computing machine, the combination with two registers, and an intermediate register shiftable to different positions, as for instance, for the computation of debits and credits, of operating mechanism adapted to operate the intermediate register in either position thereof and to operate either of the first named registers in correspondence with the intermediate register to produce therein a computation embracing the sum of the computations effected by the registers first named.

2. The combination with means for recording numbers in two column positions, of three registers, an operating mechanism arranged to operate one register when a number is printed in one column, a different register when a number is printed in the other column, and the third register when a number is printed in either column, said operating mechanism including master wheels having fixed positions relative to each other.

3. The combination with means for recording numbers in two column positions, of three registers, an operating mechanism arranged to operate one register when a number is printed in one column, a different register when a number is printed in the other column, the third register when a number is printed in either column, said operating mechanism including master wheels having fixed positions relative to each other, and said third register being shiftable laterally to different positions, as for instance, for debit and credit postings.

4. The combination with an old balance register, a posting register and a proof register, of primary operating mechanism arranged to operate either the old balance register or the posting register, and auxiliary operating mechanism arranged to operate the posting register and the proof register respectively when the primary operating mechanism operates the old balance register and the posting register.

5. The combination with an old balance register, a posting register, a new balance register and a proof register, of primary operating means arranged to operate the old balance register, the posting register and the new balance register, and auxiliary operating means arranged to operate the posting register in correspondence with the old balance register, and the proof register in correspondence with the posting register.

6. The combination with an old balance register, a posting register variable in position for debit and credit postings, a new balance register and a proof register, of primary operating means arranged to operate the old balance register, the posting register in either position thereof and the new balance register, and auxiliary operating means arranged to operate the posting register in either position thereof in correspondence with the old balance register and to operate the proof register in correspondence with the posting register in either the debit or credit position of the latter.

7. The combination with an old balance register, an item register, a posting register, a new balance register and a proof register, of primary operating means arranged to operate all of said registers except the proof register, and auxiliary operating mechanism operating in correspondence with the primary operating mechanism and arranged to operate the posting register in correspondence with the old balance register and the proof register in correspondence with the posting register when said old balance and posting registers are operated by the primary operating mechanism.

8. The combination with an old balance register, an item register, a posting register, a new balance register, a total item register and a proof register, of primary operating mechanism for the old balance, item, posting and new balance registers, and auxiliary mechanism for operating the posting register, the total item register and the proof register respectively in correspondence with the old balance, item and posting registers when operated by the primary operating mechanism.

9. The combination with an old balance register, a posting register movable to different positions for debit and credit postings, and a proof register, of a triplex actuator including a primary master member adapted to operate the old balance register and the posting register in either position of the latter, and a pair of auxiliary master members each arranged to operate the posting register in one position thereof and to operate the proof register in correspondence with the posting register.

10. The combination with an old balance register, an item register, a posting register, a new balance register, a total item register and a proof register, of a triplex actuator including a primary master member adapted to operate the old balance, item, posting and new balance registers, an auxiliary master member adapted to operate the posting register and the total item register, and a second auxiliary master member adapted to operate the proof register.

11. The combination with an old balance register, an item register, a posting register, a new balance register, a total item register and a proof register, of a triplex actuator including a primary master member adapted to operate the old balance, item, posting and new balance registers, an auxiliary master member adapted to operate the posting register and the total item register and a second auxiliary master member adapted to operate the proof register, the several master members being relatively fixed.

12. The combination with an old balance register, a posting register variable in position for debit and credit postings, a new balance register, and a proof register, of primary operating means arranged to operate the old balance register, the posting register in either position thereof and the new balance register, auxiliary operating means arranged to operate the posting register in either position thereof in correspondence with the old balance register and to operate the proof register in correspondence with the posting register in either the debit or credit position of the latter, said registers and their operating means being relatively movable for denominational spacing and relatively fixed against movement in a direction transverse to the direction of denominational movement.

13. The combination with an old balance register, an item register, a posting register, a new balance register, a total item register and a proof register, said registers being mounted as a unit and each having a series of number wheels, of a primary master wheel for the old balance, item, posting and new balance registers, and auxiliary master wheels for operating the posting register, the total item register and the proof register respectively in correspondence with the old balance, item and posting registers when operated by the primary master wheel, said master wheels being mounted as a unit, the register unit and master wheel unit being relatively movable in the direction of denominational spacing but relatively fixed with respect to movement in a direction transverse to the line of denominational movement.

In testimony whereof I affix my signature in presence of two witnesses.

CHARLES H. HUNTER.

Witnesses:
 MARSHALL H. DEAN,
 O. L. GAGG.